United States Patent Office
3,132,073
Patented May 5, 1964

3,132,073
MEASLES VACCINE
John O. MacFarlane, Robert A. Elliott, and Robert J. Hosley, Marion County, Ind., assignors to Eli Lilly and Company, Indianapolis, Ind., a corporation of Indiana
No Drawing. Filed Mar. 14, 1962, Ser. No. 179,810
4 Claims. (Cl. 167—78)

The present invention relates to a measles vaccine of the killed-virus type. More particularly, it relates to an adsorbed measles vaccine having essentially no side effects and having the capacity to afford substantially complete protection from measles.

Measles is a universal disease of childhood which is not only temporarily disabling in itself, but also has a significant incidence of serious complications, such as encephalitis. Numerous efforts have been made in the past to develop a vaccine capable of preventing the contraction of the disease or at least to minimize its pathological effects, but all of the prior-art products have been characterized by an excessive incidence of side effects or by inability to afford adequate protection.

It is an object of the present invention to provide an effective measles vaccine.

Another object is to provide a measles vaccine having a minimum of side effects.

Another object is to prepare a measles vaccine essentially free from living adventitious viruses such as are potentially present in live-virus vaccines.

Other objects of the invention and its advantages over the prior art will be apparent from the following description.

In accordance with the invention, measles virus from chick embryo tissue culture is harvested and subjected to inactivation with formaldehyde at low temperature. Residual formaldehyde is thereafter neutralized with bisulfite, the virus being stabilized with a sequestering agent and preserved with a parenterally acceptable antiseptic. The inactivated virus is adsorbed upon hydrated aluminum phosphate or other suitable adsorptive solid, and is concentrated as desired by decantation of an appropriate portion of the liquid phase.

The foregoing procedure has a number of important advantages. The use of chick embryo tissue culture for growing the virus avoids the problem of the so-called simian viruses which are encountered in the use of monkey tissue cultures. The total inactivation of the virus not only kills any adventitious viruses but also avoids the problem of febrile reactions encountered with live-virus vaccines and further avoids the possibility that vaccinated individuals may become carriers of the disease. The conditions employed for the inactivation result ultimately in a vaccine of high antigenicity, capable of providing full protection. The stabilizer and preservative yield a vaccine of long shelf life. The adsorption of the virus upon aluminum phosphate or the like provides a means of concentrating the vaccine by several fold, and in addition the adsorbent material has a very pronounced adjuvant effect, increasing the antibody response from 6 to 10-fold over the response obtained with the unadsorbed fluid measles vaccine.

In one embodiment of the invention, a measles vaccine is prepared according to the following procedure. Measles virus is obtained from inoculated cultures of chick embryo tissue grown in a conventional tissue culture medium. The virus-containing liquid is filtered to remove nonviral solids, the pH is adjusted to around 7, and formalin is added and allowed to act upon the virus at 4 to 5° C. for three days, after which the residual formaldehyde is neutralized with sodium bisulfite. The inactivated virus is preserved by adding thimerosal to a final concentration of around 1:20,000 and is stabilized by adding sodium ethylenediaminetetraacetate to a concentration around 0.001-0.002 molar. The stabilized virus, which is low in antigenicity, is then adsorbed upon hydrated aluminum phosphate, which serves to render the virus highly antigenic. The resulting adsorbed vaccine can be used as such, or can be sedimented and decanted to yield a product of increased potency. The usual tests for antigenicity, contamination, and identity are applied, and the product is dispensed into ampoules or vaccine bottles for storage and distribution.

More in detail, the invention involves the following features:

The measles virus from which the vaccine is to be prepared is grown upon monolayer cultures of trypsinized chick embryo tissues prepared from nine to twelve-day-old chick embryos, suitably by the standard method of Dulbecco and Vogt, J. Exp. Med., 99 (1954), 167. The trypsinized tissues are grown in culture bottles at around 35° C. in a suitable fluid growth medium, such as Earle's basal medium (J. Nat. Cancer Inst., 4 (1943), 165), containing lactalbumin hydrolysate and from 15 to 20 percent normal calf serum, or in the Synthetic Mixture No. 199 of Morgan et al. (Proc. Soc. Exp. Biol. and Med., 73 (1950), 1 at 6). The virus is inoculated into fresh growth medium containing a suitable antibiotic to retard bacterial growth (e.g., neomycin sulfate at 75 micrograms/ml.), and the medium is added to the tissue culture bottles, which are incubated at growth temperature around 35° C. The growth of the virus can be followed by observing the cytopathogenic change, which reaches an advanced state in from six to eight days. At the end of this time, the flasks are harvested and nonviral solids are removed from the broth by filtration.

It is an important feature of the present invention to cool the virus promptly to low temperature, below about 10° C., and preferably around 4° C., after it has been harvested from the tissue culture in which it is grown, and it is also important to carry out the inactivation of the harvested virus at such low temperatures, employing formaldehyde for this purpose at a concentration around 1:1000. The cooling should preferably take place immediately after harvest, as soon as practicable, generally within about 5 to 10 hours, and in any event before more than 24 hours have passed, in order to avoid substantial loss of antigen potential. It is theorized that the enzymes liberated from the tissue culture cells tend to act upon the virus in such a way as to impair or destroy its antigenicity. Such action is presumably slowed down by cooling to a low temperature, and it is considered likely that the enzymes are destroyed by formaldehyde. Whatever the explanation, the technique of prompt cooling and inactivation at low temperature employed in the present invention has the effect of producing an inactivated virus of high antigen potential, greatly superior to the viruses inactivated under other conditions.

For the inactivation, it is convenient to employ the so-called "formalin" of commerce, which is an aqueous 36-40 percent solution of formaldehyde, and to dilute this material around 1:10 with distilled water, isotonic salt solution, nutrient medium, or the like. It is to be understood, however, that formaldehyde can be employed in any form which provides the active aldehyde for contact with the virus; e.g., trioxymethylene, solid polymeric formaldehyde, or the like, or formaldehyde condensation products which release formaldehyde in aqueous media. It will be equally apparent that the formaldehyde composition should not include substances which would be detrimental to the vaccine if they must be allowed to remain in the virus-containing medium.

The inactivation of the virus appears to be essentially complete in around six hours. As a precautionary measure, however, the mixture is held at reduced temperature for at least about two days but not more than about four days, such prolongation of the inactivation period serving two purposes: to insure that absolutely no measles virus will remain alive, and to kill any adventitious viruses which might be more resistant than the measles virus. The residual formaldehyde is then neutralized by adding aqueous bisulfite solution (e.g., sodium bisulfite) in a sufficient amount.

A further important feature of the present invention lies in the stabilization of the virus with ethylenediaminetetraacetic acid (edathamil, edetic acid) or similar chelating agent effective for sequestering divalent metallic ions such as mercury, iron, calcium, cobalt, copper, magnesium, and other trace metals which may be present in the tissue fluids, such materials being presumably involved in the function of the tissue enzyme systems. Other illustrative sequestering agents include diethylenetriaminepentaacetic acid, bis(2-hydroxyethyl)glycine, and N-(2-hydroxyethyl)ethylenediaminetriacetic acid. All of these substances are conveniently employed in the form of the sodium, potassium, or ammonium salts, the ratio of cation to anion being such as to produce a pH around the neutral level in aqueous solution. A stabilizer concentration between about 0.001 and about 0.002 molar is generally effective for the desired purpose. The stabilizer can suitably be added before or at the time of the inactivation procedure, preferably at or immediately after the time the virus is harvested, and in any event not substantially later than the completion of the inactivation. Without a stabilizer, it is found that the virus begins to decline in antigenicity immediately after being harvested, even when maintained at low temperature, and the decline accelerates rapidly if the virus is allowed to warm to room temperature. It is important, therefore, that the stabilizing agent be added as early as possible after harvest.

Also employed is a preservative such as thimerosal or the like, which should preferably be added at or before the completion of the inactivation procedure, and at or after the time of adding the stabilizing agent. Thimerosal is effective at a concentration around 1:20,000.

The inactive fluid vaccine thus obtained is commingled with an adsorptive solid having pharmaceutically acceptable properties upon injection, the proportion of solid being preferably sufficient to adsorb substantially all of the antigenic virus therefrom. A preferred solid is hydrated aluminum phosphate in a proportion between about 0.5 and about 5 milligrams per milliliter or somewhat higher, according to the virus concentration, the optimum proportion of aluminum phosphate being ordinarily around 2 milligrams per milliliter. The adsorptive solid is preferably used in freshly precipitated form for greatest activity. Other active solids can be employed, however, which are innocuous when injected into the tissues, such as active alumina, dicalcium phosphate, and tricalcium phosphate. These materials can be prepared by metathesis of suitable precursor salts in aqueous solution, then filtering and washing, suitable precautions being taken to insure sterility. Aluminum phosphate can be prepared, for instance, by commingling aqueous solutions of aluminum chloride and disodium hydrogen orthophosphate, or aluminum potassium sulfate and trisodium orthophosphate. The resulting precipitate is filtered off, washed thoroughly with water to remove all soluble materials, and added in the wet state to the inactivated measles virus. The adsorptive material not only serves to adsorb and concentrate the inactivated virus, but also has a most remarkable adjuvant action, increasing the antigenicity of the virus by a factor of 6 to 8-fold, compared to the untreated fluid vaccine. After addition of the adsorptive solid, the slurry should be stirred in the cold for a time to promote contact and adsorption of the virus. The solids may then be allowed to settle, and the supernatant liquid can be decanted to effect concentration of the antigen to any desired level. Advantageously, the liquid is withdrawn completely and replaced with, for example, sterile physiological saline, Mixture 199, or other suitable vehicle, thereby removing impurities, in particular proteins, which might tend to reduce stability or cause sensitivity reactions.

If desired, the inactivated virus can be subjected to a preliminary concentration step by known means prior to conversion to the adsorbed form.

The adsorbed measles vaccine of the present invention is conveniently incorporated into multiple antigen combinations to permit simultaneous immunization against two or more diseases. Such combinations can be made, for example, with poliomyelitis vaccine, with diphtheria toxoid, with tetanus toxoid, with pertussis extracted antigen, and/or with mumps vaccine. One such combination comprises phosphate-adsorbed measles vaccine, poliomyelitis vaccine, alum-precipitated diphtheria toxoid, and alum-precipitated tetanus toxoid. A second example comprises the same components plus pertussis extracted antigen, alum-precipitated. A third combination consists of phosphate-adsorbed measles vaccine, concentrated poliomyelitis vaccine, pertussis extracted antigen, and a concentrated alum-precipitated combination of diphtheria and tetanus toxoids. Such combinations are conveniently prepared in a suitable dosage volume by sedimenting the aluminum phosphate-adsorbed measles vaccine, decanting the supernatant, and adding the solid in a suitable ratio to the other vaccine components. The compositions are stable in antigenic potency when stored at moderately elevated temperature (35° C.) for an extended period. In every case, they should preferably include a stabilizer and a preservative, and storage should be around the neutral level, pH 6–7.

The invention will be more fully understood from the following operating example, which is submitted solely for the purpose of illustrating the invention and not as a limitation upon the scope thereof.

EXAMPLE

*Cell extraction.*—Whole embryos from chicken eggs which have been incubated for 10 days are aseptically removed from the shells and the heads are separated and discarded. Several embryos are placed in a mincing tube and given two rinses, each rinse employing 20 ml. of pH 7.5 phosphate buffer solution (Dulbecco et al., loc. cit.) per embryo. The rinsed embryos are minced with scissors to a particle size of around 1 to 2 mm. The mince from 24 embryos is placed in a fluted flask and rinsed with buffer solution, 20 ml. per embryo, after which the rinse is repeated with an equal quantity of buffer solution warmed to 37° C. All rinse liquids are discarded. To the mince is added trypsin in buffer solution (0.25 percent trypsin in the Dulbecco et al. buffer solution) previously warmed to 37° C., in the proportion of 20 ml. per embryo. The flask is placed on a magnetic stirrer and stirred for 15 minutes, after which the large particles are allowed to settle and the supernatant fluid is decanted and placed in a chilled container in an ice bath. Trypsin in buffer is again added in the same amount to the settled particles, and the stirring and decanting are repeated. The pooled supernatant fluid is filtered through three layers of sterile gauze into four sterile, chilled 250-ml. centrifuge bottles. The bottles are centrifuged at 1500 r.p.m. for 10 minutes at a temperature around 4° C. The supernatant liquid is removed from the packed cells and the cells are washed three times with fresh Mixture 199 (Morgan et al., loc. cit.) by adding 100 ml. of the liquid medium to each bottle, thoroughly suspending the cells, centrifuging at 1000 r.p.m. for five minutes at 40° C., and decanting, the last wash being carried out in a graduated centrifuge tube.

*Cell planting.*—The packed cells are added to Mixture 199 in the ratio of one milliliter of cells to one liter of the medium, the latter containing 75 $\mu$g. of added neomycin sulfate per milliliter. The cells are suspended and maintained in suspension by using a magnetic stirrer, and the suspension is dispensed into culture bottles at the rate of 80 ml. per bottle. The bottles are then incubated at 35-36° C. for two to three days until a confluent sheet of cells is obtained.

*Virus inoculation.*—All bottles are checked visually for contamination, and a representative number of the bottles are examined microscopically for contamination and for the general condition of the cell sheet. Unsatisfactory bottles are discarded. The spent medium is withdrawn from the satisfactory bottles, and to each bottle are added 80 ml. of fresh Mixture 199 containing neomycin sulfate at a level of 75 μg. per milliliter and measles seed virus at a level of 50 to 75 ml. per liter. The bottles are returned to the incubator at 35-36° C.

*Virus harvest.*—The bottles are examined microscopically, beginning on the third day. It is normally found that the cell sheet shows extensive cytopathological involvement at four to six days after virus inoculation, and that the bottles are ready to harvest at six to eight days. Any contaminated bottles are discarded. Satisfactory bottles are shaken to loosen the cells and are harvested aseptically, the fluid from approximately 50 bottles being combined into a 5-quart bottle. The combined material is chilled and filtered through Selas XFF and Selas 10 filter candles, the filtrate is adjusted to pH 6.9-7.1 with sterile 0.5 N acetic acid, and the material is tested for sterility and virus concentration.

*Virus inactivation.*—The virus-containing liquid is cooled to about 4° C. by circulation through a heat exchanger. Formaldehyde solution, reagent grade, is diluted 1:10 with Mixture 199 and is added to the cold virus-containing liquid to a final formaldehyde concentration of 1:1000. The mixture is placed in a chillroom at 4 to 5° C. After three days in the chillroom, the residual formaldehyde is neutralized by adding aqueous 35 percent sodium bisulfite solution, 5 ml. per liter. Samples are withdrawn at this time for detection of live virus by appropriate means, such as tests in human amnion cells.

*Stabilization and preservation.*—Immediately following removal of the virus detection test samples, ethylenediaminetetraacetic acid is added in the form of an aqueous 0.247 molar solution of the 2-3 sodium salt to a final concentration of 0.00124 M and thimerosal is added as a 10 percent solution in distilled water to a final concentration of 1:20,000. The pH is then adjusted to 6.9-7.1 with 0.5 N acetic acid or 0.5 N sodium hydroxide. Samples are removed for sterility tests, and the bulk material is returned to the chillroom.

*Adsorption.*—To the inactivated fluid is added precipitated aluminum phosphate in a sufficient quantity to give an AlPO₄ concentration of 1.75 mg. per ml. of vaccine. The mixture is adjusted to pH 6.0-6.5 with 0.5 N acetic acid and is returned to the chillroom to permit the aluminum phosphate to sediment. The supernate is withdrawn and discarded. The sediment is resuspended in Mixture 199 containing ethylenediaminetetraacetic acid 2-3 sodium salt at 0.00124 molar concentration and thimerosal (1:20,000), the final volume being one-half that of the original virus-containing liquid. The pH is checked and adjusted as necessary to the 6.0 to 6.5 level. Samples are removed for bulk sterility and potency tests. After satisfactory completion of all tests, the bulk lot of adsorbed vaccine is filled into 5-ml. vaccine vials. Samples are withdrawn for final filled sterility tests, safety tests, residual formaldehyde assay, and identity tests.

We claim:

1. A method for preparing an improved measles vaccine, which comprises growing measles virus in a chick embryo monolayer tissue culture, harvesting the virus, cooling the harvested virus to a temperature below about 10° C. prior to any substantial degradation thereof, commingling formaldehyde with the virus-containing liquid in a ratio of around 1:1000 and allowing the formaldehyde and virus to remain in contact at a temperature below about 10° C. for a period of at least about two days, whereby the virus is inactivated while its antigenicity is maintained at a high level, neutralizing residual formaldehyde with bisulfite, adding a metal-ion sequestering agent to the virus-containing liquid as a stabilizer before any prolonged exposure thereof to ordinary or elevated temperatures, adding thimerosal thereto as a preservative, and commingling therewith an adsorptive solid having pharmaceutically acceptable properties upon injection, the proportion of said solid being sufficient to adsorb substantially all of the antigenic virus therefrom, whereby an adsorbed measles vaccine of high and stable antigenicity is obtained.

2. A method for preparing an improved measles vaccine, which comprises growing measles virus in a chick embryo monolayer tissue culture, harvesting the virus, cooling the harvested virus to a temperature below about 10° C. prior to any substantial degradation thereof, commingling formaldehyde with the virus-containing liquid in a ratio of around 1:1000 and allowing the formaldehyde and virus to remain in contact at temperature below about 10° C. for a period of about two to about four days, whereby the virus is inactivated while its antigenicity is maintained at a high level, neutralizing residual formaldehyde with sodium bisulfite, adding ethylenediaminetetraacetic acid to the virus-containing liquid as a stabilizer before any prolonged exposure thereof to ordinary or elevated temperatures, adding thimerosal thereto as a preservative, and commingling therewith hydrated aluminum phosphate in a proportion between about 0.5 and about 5 milligrams per milliliter, whereby an adsorbed measles vaccine of high and stable antigenicity is obtained.

3. A method for preparing an improved measles vaccine, which comprises growing measles virus in a chick embryo monolayer tissue culture, harvesting the virus, cooling the harvested virus to a temperature below about 10° C. prior to any substantial degradation thereof, commingling formaldehyde with the virus-containing liquid in a ratio of around 1:1000 and allowing the formaldehyde and virus to remain in contact at a temperature around 4° C. for a period of about three days, whereby the virus is inactivated while its antigenicity is maintained at a high level, neutralizing residual formaldehyde with sodium bisulfite, adding ethylenediaminetetraacetic acid to the virus-containing liquid as a stabilizer before any prolonged exposure thereof to ordinary or elevated temperatures, adding thimerosal thereto as a preservative, commingling therewith hydrated aluminum phosphates in the proportion of about 2 milligrams per milliliter, whereby the inactivated virus is adsorbed thereon, sedimenting the adsorbate, and decanting supernatant liquid, whereby a concentrated measles vaccine of high and stable antigenicity is obtained.

4. An improved measles vaccine, prepared by the method of claim 3.

References Cited in the file of this patent

UNITED STATES PATENTS

| | | |
|---|---|---|
| 2,399,443 | Masucci | Apr. 30, 1946 |
| 2,772,202 | Jacobs | Nov. 27, 1956 |
| 2,967,802 | Towey et al. | Jan. 10, 1961 |
| 3,031,485 | Cannon | Apr. 24, 1962 |
| 3,035,980 | Tint et al. | May 22, 1962 |

OTHER REFERENCES

Warren: "The Relationships of the Viruses of Measles, Canine Distemper, and Rinderpest," Advances in Virus Research, vol. 7, pp. 27-60 (1960).

Frankel et al.: "Serological Response of Guinea Pigs to Inactivated Measles Virus," Bact. Proc. page 58 (1958).

De Witt et al.: "Studies on Measles Virus in Tissue (Other references on following page)

Culture; III, Antigenicity of Live and Killed Measles Virus in a Nonsusceptible Host," J. Immun. 84, pp. 194–202, February 1960.

Kempe: "Immunization of Children With Inactivated Measles Vaccine," presented at 30th annual meeting, Society for Pediatric Research, Syampscott, Mass., May 3–4, 1960, per Warren, Adv. vir. Res. 7, pp. 58, 60 (1960).

Musser et al.: "Studies on Measles Virus; II, Physical Properties and Inactivation Studies of Measles Virus," J. Immun., vol. 85, pp. 292–297, September 1960.

International Conference on Measles Immunization, N.I.H., Bethesda, Maryland, Nov. 7–9, 1961, published by American Journal of Diseases of Children, vol. 103, No. 3, March 1962.

"Concentrated Inactivated Measles-Virus Vaccine, Preparation and Antigenic Potency," pp. 418–423, Warren et al.

"Protective Value of Inactivated Measles Vaccine," Feldman, pp. 423–424.

"Field Trial of Inactivated Measles Vaccine," Karzon et al., pp. 425–426.

"Experience With Measles Immunization, Alum-Absorbed Killed Measles-Virus Vaccine and Live Measles-Virus Vaccine Challenge," Karelitz et al., pp. 427–429.

"Discussion on Immunization of Man against Measles," Lipschutz et al., pp. 429–431.

"Immunogenic Response to Killed Measles-Virus Vaccine, Studies in Animals and Evaluation of Vaccine Efficacy in an Epidemic," Hilleman et al., pp. 441–451.

"Potency Measurement of Inactivated Measles Vaccines," Warren et al., pp. 452–457.

"Report on Session V; Problems of Production and Biologics Control of Measles Vaccine," Payne, pp. 514–517.

"Future of Measles Vaccine in the U.S.A, Part I," Stokes, pp. 525–528.

"Future of Measles Vaccine in the U.S.A., Part II," Shaw, pp. 528–531.

UNITED STATES PATENT OFFICE
CERTIFICATE OF CORRECTION

Patent No. 3,132,073 May 5, 1964

John O. MacFarlane et al.

It is hereby certified that error appears in the above numbered patent requiring correction and that the said Letters Patent should read as corrected below.

Column 4, line 69, for "40° C." read -- 4° C. --.

Signed and sealed this 22nd day of September 1964.

(SEAL)
Attest:

ERNEST W. SWIDER
Attesting Officer

EDWARD J. BRENNER
Commissioner of Patents